Figure 1:
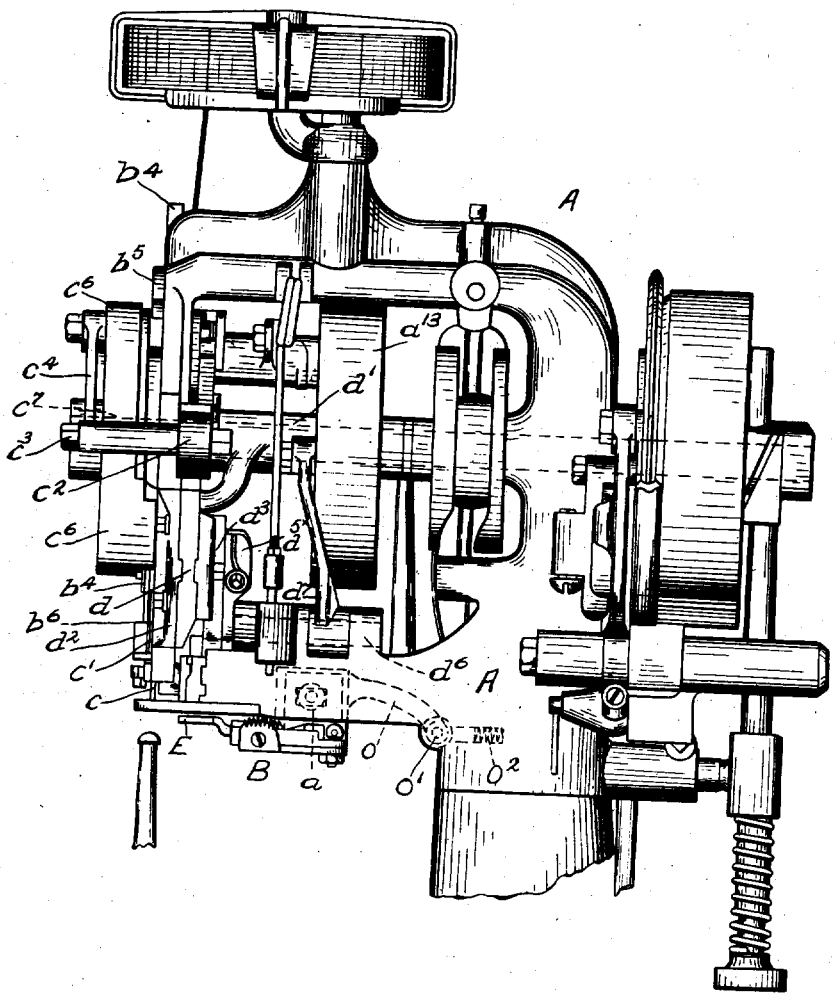

F. F. ENO.

WORK GAGE FOR FASTENER INSERTING MACHINES.

APPLICATION FILED FEB. 11, 1911.

Reissued July 9, 1912.

13,438.

2 SHEETS—SHEET 1.

Witnesses.
Amelia M. Ross
Carrie L. Parker

Inventor.
Frank F. Eno
by Robt. P. Hains
atty.

F. F. ENO.

WORK GAGE FOR FASTENER INSERTING MACHINES.

APPLICATION FILED FEB. 11, 1911.

Reissued July 9, 1912.

13,438.

2 SHEETS—SHEET 2.

Witnesses.

Amelia M. Ross

Carrie L. Barker

Inventor.

Frank F. Eno.

by Robt. P. Fairs

Atty.

UNITED STATES PATENT OFFICE.

FRANK F. ENO, OF BOSTON, MASSACHUSETTS, ASSIGNOR TO UNITED SHOE MACHINERY COMPANY, OF PATERSON, NEW JERSEY, A CORPORATION OF NEW JERSEY.

WORK-GAGE FOR FASTENER-INSERTING MACHINES.

13,438. Specification of Reissued Letters Patent. Reissued July 9, 1912.

Original No. 945,310, dated January 4, 1910, Serial No. 351,067. Application for reissue filed February 11, 1911. Serial No. 608,156.

*To all whom it may concern:*

Be it known that I, FRANK F. ENO, a citizen of the United States, residing at Boston, in the county of Suffolk and State of Massachusetts, have invented an Improvement in Work-Gages for Fastener-Inserting Machines, of which the following description, in connection with the accompanying drawings, is a specification, like letters on the drawings representing like parts.

This invention relates to work gages for machines for inserting metallic or other fasteners in stock, and more particularly to work gages for controlling the position of heels of boots or shoes with relation to any convenient form of inserting mechanism.

In securing the toplift to a heel pile it is customary to spank the toplift upon the projecting ends of the heel nails, but this securing means is insufficient to maintain the toplift in position as the shoe wears under its various conditions of use. It is desirable that additional securing means, therefore, be provided to insure that the toplift will not become loosened from the heel and be lost during the wear of the shoe. One form of these additional securing means may consist in an insertion through the face of the toplift and into the heel pile of one or more fasteners, of such length that they may project a sufficient distance into the heel to firmly secure the toplift thereto. As the ends of these additional fasteners show upon the face of the toplift, where two or more are used they should be so positioned with relation to the edge of the toplift that they will not mar the appearance of the finished shoe, that is, the series of fasteners should be placed symmetrically upon the toplift.

With these general considerations in view, the object of this invention is to provide a work gage so constructed that securing means additional to the heel nails, as, for instance, a series of fasteners, may be inserted through a toplift and symmetrically with relation to its edge without the necessity of the operative using his judgment in spacing or otherwise positioning them.

My invention will be best understood by reference to the following description, when taken in connection with the accompanying drawings showing a specific embodiment thereof, while its scope will be more particularly pointed out in the appended claims.

Figure 2:
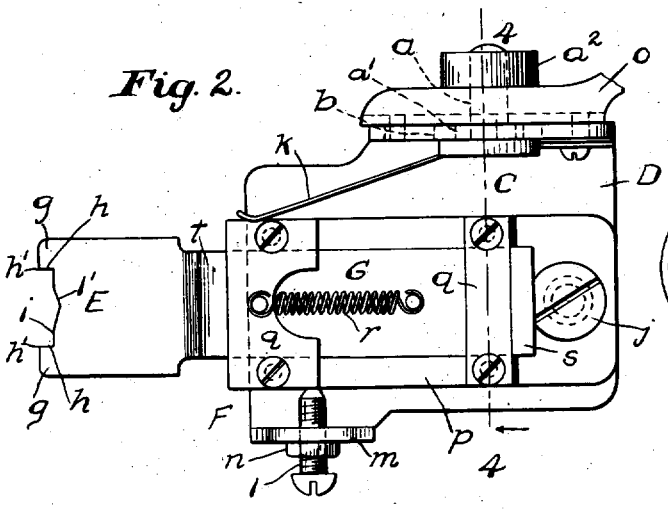
Figure 5:
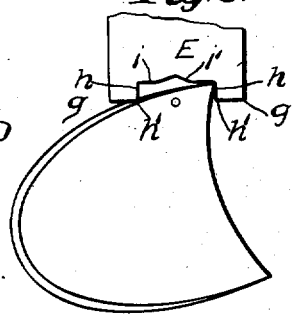
Figure 6:
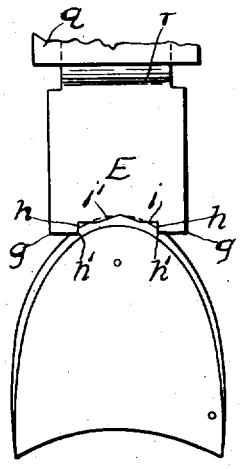
Figure 3:
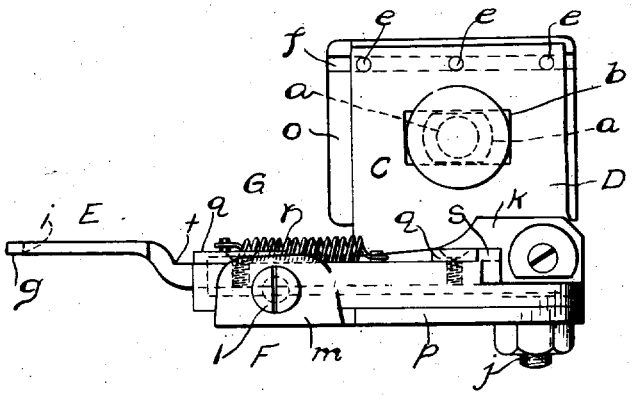
Figure 7:
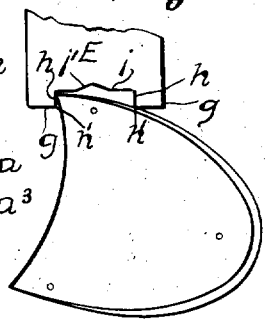
Figure 4:
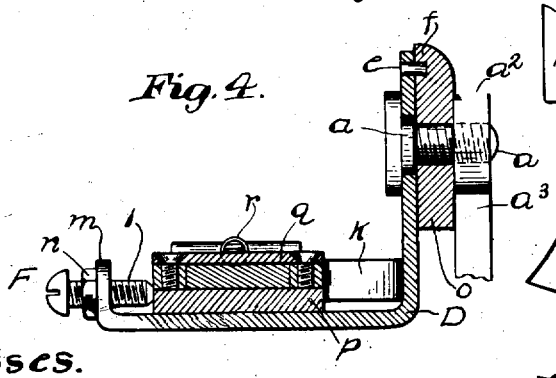

In the drawings,—Figure 1 shows a typical metallic fastener inserting machine having my improved gage attached thereto; Fig. 2 is a detail plan view of the gage; Fig. 3 is a side elevation of the parts shown in Fig. 2; Fig. 4 is a transverse section taken on the line 4—4 of Fig. 2; and, Figs. 5, 6 and 7 are diagrammatic views, illustrating the successive positions a toplift may assume during the insertion of three additional fasteners.

In the embodiment of my invention selected for illustration herein and shown in the accompanying drawings, referring more particularly to Fig. 1, A represents the working head of a type of metallic fastener inserting machine, generally known as the "Universal Slugger", which machine is fully described and illustrated in U. S. patent to L. A. Casgrain, No. 786,190, of March 28, 1905. As described in said patent, and more particularly in the prior U. S. patent mentioned therein to L. Goddu, No. 563,478, for a nailing machine, granted July 7, 1896, a driver bar $b^4$ is mounted in suitable guideways behind a fixed face plate $b^5$ of the machine head, said driver bar having suitably attached to it a driver $b^6$, which enters a driver passage in the nose of the machine during the operation of inserting fasteners. An awl $c$ is attached to the lower end of an awl bar $c'$, provided at one side with teeth, which are engaged by teeth on an arm $c^2$, forming part of a two-armed lever mounted upon a stud screw $c^3$, its other arm $c^4$ being provided with a cam roll which enters a groove in the outer face of the cam disk $c^6$, fast upon the forward end of the main shaft $c^7$. The rear side of the cam disk $c^6$, is provided with a cam groove, which receives a cam roll extending from the front of the driver bar $b^4$, said cam reciprocating said driver bar positively up and down. The shank of the awl bar is adapted to slide vertically in guideways in a rocking frame $d$, having a sleeve-like hub, which embraces a hub surrounding the main shaft $c^7$, in front of a cam disk $a^{13}$, mounted upon the main shaft. The rocking frame has suitably attached to it at its front side a movable guide $d^2$, for the awl bar in its vertical movement, and at its rear side, said rocking frame has attached to it a guideway having a movable side $d^3$, which parts are suitably connected to a rocking arm $d^{5x}$, connected to a short rock-shaft $d^6$, having an arm $d^7$, provided with a cam roll which enters a cam groove in the forward side of the cam disk $a^{13}$. This rock-shaft, by engaging the sliding block, moves the rocking frame to effect the feeding of the stock, while the awl is in it, over the horn.

In the operation of the inserting mechanism, as described, the awl enters the stock through rotation of the cam disk $c^6$, while the driver is in its raised position, and thereafter the cam disk $a^{13}$ operates, through the rocking connection described, to move the awl bar laterally, thus feeding the stock and bringing the awl beneath the raised driver. The cam groove controlling the vertical movements of the awl then operates to withdraw the awl from the stock and moves it laterally in the reverse direction to that for feeding until the awl bar is clear of the driver. The cam disk $c^6$ has been rotated to such a position at this time that the cam groove controlling the vertical movements of the driver $b^6$ operates to force the driver downward quickly and drive a fastener, which, by this time, has been placed beneath it. The driver is immediately withdrawn to its raised position, when the awl again descends and feeds the stock, as above described. All other features of the machine shown in Fig. 1 are and may be as described in the patent to Casgrain above referred to and therefore need not be referred to in detail herein. As described in said patent to Casgrain, a gage support or arm $o$ is pivoted upon a stud $o'$, mounted in the frame of the head A, and is acted upon by a spring pin $o^2$, which retains said support in the elevated or working position shown in the drawing, but permits it to be depressed when not needed. In this form of the present invention, to the forward end of the support is connected the gage proper B (see Fig. 1), the connection being denoted generally by the letter C. The connection C is preferably adjustable and may be of any convenient construction, but I prefer to pass a headed screw stud $a$ through a longitudinal slot $b$, in a portion of a bracket D, which, in the illustrated embodiment of the invention, supports the engaging portion E of the work gage, said stud passing through a suitable aperture in the support $o$. The stud $a$ is preferably provided with a flattened collar $a'$, which rests within the slot $b$, and serves as a block on which the work gage B may ride when being adjusted. The parts $o$ and D are secured together by means of a lock nut $a^2$, upon the stud $a$. The lock nut $a^2$ may, if desired, be operated by a handle $a^3$. The bracket D is provided with a series of pins $e$, which project into a slot or guide $f$, in the support $o$, thus forming a guide for the movement of one part upon the other during adjustment and preventing rotation of said parts about the stud $a$, when the lock nut is loosened.

It has been found in practice that a desirable number of additional fasteners to be used is three, although any number may obviously be employed, and in order to give a neat appearance to the finished shoe, they are preferably positioned one at each breast corner of the toplift and one in the center of the rear portion of the lift, which, for convenience, I will term the "curve" of the heel.

In the preferred construction of the work gage B, for use in inserting additional fasteners, for instance, in the locations just described, its work engaging portion is preferably formed with a plurality of stop portions or faces, with which the stock contacts when properly positioned for receiving the fasteners. These stops or stop faces may be formed by constructing said engaging portion, designated generally by the letter E, with an irregular work engaging surface. One manner of accomplishing this result is to form upon said portion E, one or more projections or abutments $g$, preferably oppositely disposed, and when so located, forming stop portions or faces $h$, the edges formed by the meeting edges of the faces $h$, with the forward faces of the abutments $g$ forming other stop portions $h'$, and the remaining part $i$ of the engaging portion forming another stop face.

Referring more particularly to Figs. 5 and 7, the mode of use of the stop faces formed by the abutments $g$ will be readily understood. The gage is first set, by means of the connection C, so that the face $i$, of the engaging portion E, is adjusted relatively to the machine head in such position that when one of the breast corners of a toplift is placed in engagement with the shoulder formed by one of the stop faces $h$, and the face $i$, and its edge also engages one of the stop portions $h'$ (Figs. 5 or 7), on operating the machine a fastener will be inserted the desired distance from the outer edge of the lift. When three fasteners are used, they are most conveniently inserted in the order shown in Figs. 5 to 7, that is, first at the one breast corner, then at the curve, and, finally, at the remaining breast corner; the lift and shoe having been appropriately turned by the operative during this operation. During this operation the lift engages first one stop portion $h'$, independently of the other, then the two stop portions $h'$, simultaneously, and then the other stop portion $h'$, independently of the first.

When the gage is to be used with a machine using a type of feed such as an awl feed, for instance, the machine illustrated in Fig. 1, means should be provided for allowing the gage a transverse movement with the feed of the stock, which movement, however, is not necessary where a form of feed is used that moves the stock after a fastener has been inserted. In order to provide for this transverse movement of the gage, when it is necessary, I have shown the shank of the engaging portion E, as pivotally mounted at *j* on the bracket D and movable yieldingly in the direction of feed, for example, against a leaf spring *k*. In order to maintain the symmetry of the fasteners thus inserted, it is obvious that those at the breast corners should be similarly spaced from the breast edge of the toplift, as well as from the outer edge of the lift, and the fastener at the curve of the heel should be centrally disposed with relation to the two breast corner fasteners. If the engaging portion E, of the gage B, is located centrally transversely with relation to the awl of the inserting mechanism, or if an awl is not used, with relation to the point at which the fastener leaves the machine, then the stop faces formed, as described, by the abutments, are equi-distant laterally from the awl or from the point where the fastener leaves the machine. When in such location these stops will control the position of the heel for receiving fasteners at the breast corners and will insure that the fastener at one breast corner is inserted the same distance from the breast edge as the fastener at the other breast corner. By reference to Figs. 5 and 7, it is seen that the described stop portions or faces form means to maintain the breast corners of the heel in such position with relation to the inserting mechanism that each fastener will be inserted in the same location with relation to the angle of its breast corner.

Frequently, when the work gage is placed upon a machine, its support *o* is out of alinement and, therefore, when the engaging portion E is properly adjusted longitudinally relatively to the inserting mechanism, the awl, or the point where the fasteners leave the machine, as the case may be, will not be centrally located between the stop faces *h*. In this case it is obvious that as the heel is turned to receive the fasteners at its breast corners, one of said fasteners would be nearer the breast edge than the other, according to the amount that the gage is off center transversely. In order to remedy this defect I have provided transverse adjusting means, generally designated by the letter F, which may consist of a set screw *l*, threaded through a lug *m*, on the bracket D, and held in any position of adjustment by means of a lock nut *n*, the gage, in the illustrated embodiment of the invention, being maintained against the end of said set screw by means of the spring *k*. With this construction, when it is found that the engaging portion E, of the work gage is not centrally disposed with relation to the inserting mechanism, as it should be, the set screw *l* is turned so as to adjust the gage transversely until such central location is obtained and is then locked in position. I have, through this adjustment, provided means for insuring a symmetrical location of the fasteners at the breast corners of the heel, without regard to whether the support *o* is in proper alinement with the machine frame.

Frequently, the location of the heel nails is such that if the additional fastener at the curve of the heel were placed the same distance from the outer edge of the toplift as the fasteners at the breast corners, the awl in making its hole for the fastener, or the fastener itself as it is driven, as the case may be, will strike one of the heel nails. As a result, either the awl will be broken or the fastener will be bent and will not enter the heel. The location of the heel nails within the toplift can generally be determined by discoloration of the leather, or by other indicating marks well known to the shoe operative, so that when the toplift is placed in position to receive its fastener at the curve, he can tell by inspection whether or not the additional fastener will be driven upon a heel nail. If it happens that such is going to be the case, the additional fastener at the curve should be inserted inside of the line of heel nails but still centrally with relation to the breast nails, so that the symmetry of the three fasteners will not be disturbed. I prefer to provide for allowing this to be done by movably mounting the engaging portion E, upon its supporting bracket D, preferably yieldingly, as generally indicated by the character G.

Referring more particularly to Figs. 2 to 4, the shank of the engaging portion E is slidably mounted in a frame *p*, which forms a suitable guideway and is retained within the frame by means of cross bars *q*, extending across its top. A coil spring *r* is connected at one end to a pin on the engaging portion E, and at its other end to a pin upon one of the cross bars *q*, in such position that the portion E is normally maintained in its forward position. This movement may be limited by means of a shoulder *s* on the portion E, arranged to abut against one of the cross pieces *q*. Any convenient means may be employed to limit the rearward movement of the engaging portion E. As shown, the forward end of its shank is preferably in a different horizontal plane from the rear end thereof,—see Fig. 3,—and when so constructed the shoulder *t* thus formed limits the rearward movement by abutting against one of the cross-pieces *q*. With this construction it is readily seen that if the position of the heel nails is such that they conflict with the insertion of the additional fastener at the curve of the heel the operative may, by pressure upon the shoe, move the shank of the portion E longitudinally in its guide against the force of the spring $r$, until the heel has reached a position where the additional fastener will clear the heel nails, when it may be inserted. It is obvious that this longitudinal movement of the gage merely brings the fastener at the curve of the heel nearer to the fasteners at the breast corners and does not alter its transverse relation to said fasteners, therefore preserving their symmetrical relation as is desired.

In practice, when no slugs are to be inserted in the heel, the three additional fasteners are preferably inserted quite near the edge of the toplift, but if the heel is to be slugged the relation of the additional fasteners to the edge of the toplift should be altered according to the location and amount of slugging to be done. For instance, if the heel is to be quarter or half slugged it is only necessary to place the fastener at the curve of the heel farther in from the edge, and this is done by moving the engaging portion E longitudinally, when that fastener is to be inserted, as just described. If, however, the heel is to be full slugged, the fasteners at the breast corners should also be moved inward from the edge of the lift, so as not to conflict with the line of slugging and, therefore, in shoes where this form of slugging is used, the portion E is moved longitudinally against the spring $r$ for all three fasteners. Obviously, however, where the additional fasteners are to be inserted into a number of shoes, successively, that are to be full slugged later, the work may be done more quickly by adjusting the gage B, on its support $o$, to such position that all fasteners will be driven the increased distance inward without the necessity of using the yielding mounting G. If three-quarter slugging is used only one of the breast corner fasteners would conflict with the slugging but, in order to preserve the symmetrical relation of the three fasteners, all three are inserted a greater distance inward from the edge of the lift than is customary with no slugging.

It should be especially noted that when the engaging portion E is moved longitudinally to increase the distance inward of the fasteners at the breast corners, this movement does not alter the location of said fasteners with relation to the breast edge of the toplift. That is, no matter what the location of the fasteners with relation to the outer edge of the heel, their relation to the breast edge always remains the same. Of course, this latter relation could be changed, if desired, by spacing the stop faces $h$ farther apart or nearer together, which could be readily done by inserting another part or otherwise modifying the construction of the work engaging surface.

In the operation of the machine, after adjustment through the connection C, and the devices F, as hereinbefore described, one breast corner of the heel is placed in contact with one of the abutments $g$, in such position that a plurality of the stop portions or faces are engaged (see Fig. 5) so as to control the position of the stock against movement in two directions, and a fastener is inserted usually without pressing the engaging portion E backward longitudinally. The shoe is then turned until the curve of the heel rests either against the stop face $i$, or against the stop portions $h'$, according to the relative size or contour of the heel and engaging portion E, and a fastener is driven centrally of the curve of the toplift, the portion E being pressed backward, as shown in Fig. 6, or not, as is found necessary. When the toplift is so small that its curve engages only the stop $i$ and not the stops $h'$, it is convenient to form in the stop face $i$ a recess or depression as $i'$, which may be V-shaped, as shown, or of any other configuration, that will aid in centering the heel with relation to the inserting mechanism. The shoe is then turned until the other breast corner rests against the other abutment $g$, and the stop faces formed thereby (see Fig. 7) and a third fastener is inserted while the heel is in this manner maintained in correct position with relation to the inserting mechanism.

Obviously, the construction as herein illustrated may be varied and changed in numerous particulars, without departing from the spirit and scope of my invention and nothing herein contained is to be construed as limiting my invention in scope to the particular embodiment selected for illustration and explanation. Such alteration and modification will be apparent to those skilled in the art.

Having thus described my invention by means of one embodiment thereof as an illustration of the same, what I claim in addition thereto, and desire to secure by Letters Patent, is:

1. A work gage for fastener inserting machines, comprising a work engaging member having a recessed edge forming fixed and oppositely disposed abutments for engagement singly by the breast corners of a heel, the recessed edge between said abutments being provided with stop faces for engagement by the rear of the heel.

2. A work gage for boot and shoe machines, comprising a plate having a recessed edge forming opposite stop portions $h$, $h$ for engaging the breast corners of a heel and intermediate stops $i$, $i$ for engaging the rear of a heel.

3. A work gage for boot and shoe machines, comprising a yieldingly mounted plate having a recessed edge forming opposite stop portions *h*, *h* for engaging the breast corners of a heel and intermediate stops *i*, *i* for engaging the rear of a heel.

4. A work gage for fastener inserting machines, comprising a work engaging member having a recessed edge forming fixed and oppositely disposed abutments for engagement singly by the breast corners of a heel, the recessed edge between said abutments being provided with stop faces for engagement by the rear of the heel, and means for adjusting said work engaging member transversely.

5. In a gage for fastener inserting machines, a plate or work engaging member having fixed abutments with stop faces to engage singly with the corners of a heel, and stop portions, one for each abutment, the stop portion of one abutment being disposed to engage the side of the heel when the stop face of the other fixed abutment is engaged with the corner of the heel.

6. In a gage for fastener inserting machines an engaging member having relatively fixed heel edge engaging portions, a support therefor, means whereby said member may be moved relatively to its support, and means whereby the support and member may be adjusted in and out relatively to the machine head.

7. A work gage for fastener inserting machines, comprising means for effecting a two-dimensional location of one breast corner of the heel, means for effecting a two-dimensional location of the other breast corner of the heel, said two-means acting non-concurrently in locating the breast corners in different positions of the heel, and means for positioning the back of the heel.

8. In a fastener inserting machine provided with work feeding means, work gaging means constructed to effect a two-dimensional positioning of the work with respect to the inserting mechanism, said gaging means having one of its work engaging portions projecting normally into the path of feed of the work, and a support for said gaging means having provision for movement of said aforementioned work engaging portion as the work is fed.

9. In a fastener inserting machine provided with work feeding means, a gage constructed to effect a two-dimensional positioning of the work and having a portion projecting normally into the path of feed of the work, and means for supporting said gage having provision for movement of said gage with the work as the work is fed and having further provision for yielding movement of said gage in a direction substantially normal to the direction of the work feed.

10. A gage for determining the location of fasteners to be driven singly into a heel, comprising means for engaging the breast and outer surface of the heel in locating the position of a fastener near one breast corner, means acting non-concurrently of said first-named means for engaging the breast and outer surface of the heel in another position thereof in locating the position of a fastener near the other breast corner, said means being relatively fixed, and means for locating a fastener intermediate the breast corner fasteners.

11. A work gage for fastener inserting machines comprising work-engaging devices for contacting with the work at the breast of a heel and at the heel outer contour to effect a separate two-dimensional location of the breast corners of the heel for the insertion of fasteners adjacent thereto and means for positioning the back of the heel for the insertion of a fastener intermediate the breast corners.

In testimony whereof, I have signed my name to this specification, in the presence of two subscribing witnesses.

FRANK F. ENO.

Witnesses:
A. H. HANDLEY,
N. TORVARD.

Copies of this patent may be obtained for five cents each, by addressing the "Commissioner of Patents, Washington, D. C."